(12) United States Patent
Hein et al.

(10) Patent No.: US 7,600,713 B2
(45) Date of Patent: Oct. 13, 2009

(54) PRE-HUNG INLET DOOR SYSTEM

(75) Inventors: Jeffrey M. Hein, Tempe, AZ (US);
Nicholas A. Williams, Phoeniz, AZ (US)

(73) Assignee: Honeywell International Inc., Morristown, NJ (US)

( * ) Notice: Subject to any disclaimer, the term of this patent is extended or adjusted under 35 U.S.C. 154(b) by 593 days.

(21) Appl. No.: 11/072,467

(22) Filed: Mar. 4, 2005

(65) Prior Publication Data
US 2006/0196993 A1 Sep. 7, 2006

(51) Int. Cl.
B64D 33/02 (2006.01)
(52) U.S. Cl. .................................... 244/53 B
(58) Field of Classification Search ............... 244/53 B, 244/110 B, 129.4, 129.5; 137/15.1, 15.2; 60/270.1
See application file for complete search history.

(56) References Cited

U.S. PATENT DOCUMENTS

| | | | |
|---|---|---|---|
| 3,585,757 A | 6/1971 | Ritchie et al. | |
| 3,991,782 A | 11/1976 | Schwarzler | |
| 4,203,566 A * | 5/1980 | Lord | 244/57 |
| 4,418,879 A | 12/1983 | Vanderleest | |
| 4,474,344 A * | 10/1984 | Bennett | 244/53 B |
| 5,046,686 A | 9/1991 | Carla et al. | |
| 5,199,369 A | 4/1993 | Meyer et al. | |
| 5,305,969 A | 4/1994 | Odell et al. | |
| 6,079,667 A | 6/2000 | Gruensfelder | |
| 6,247,668 B1 * | 6/2001 | Reysa et al. | 244/58 |
| 6,264,137 B1 | 7/2001 | Sheoran | |
| 6,272,838 B1 | 8/2001 | Harvell et al. | |
| 6,341,748 B1 | 1/2002 | Brooks et al. | |
| 6,349,899 B1 * | 2/2002 | Ralston | 244/53 B |
| 6,395,369 B1 * | 5/2002 | Randone | 428/99 |
| 7,232,097 B2 * | 6/2007 | Noiseux et al. | 244/121 |

FOREIGN PATENT DOCUMENTS

| | | |
|---|---|---|
| EP | 0876954 A2 | 11/1998 |
| WO | WO 00/55485 | 9/2000 |
| WO | WO 2005/016748 A2 | 2/2005 |

OTHER PUBLICATIONS

PCT International Search Report, PCT/US2006/009023, dated Mar. 9, 2007.
European Search Report, 06111358.5-2422, May 19, 2006.
European Communication dated Dec. 10, 2008 for Application No. EP 06111358.

* cited by examiner

Primary Examiner—Tien Dinh
(74) Attorney, Agent, or Firm—Ingrassia Fisher & Lorenz, P.C.

(57) ABSTRACT

A pre-hung air inlet door assembly comprises an inlet door, a door box frame, and an actuation system. The door box frame is fastened to the support structure of an aircraft. The inlet door is operationally connected to the actuation system. The entire pre-hung air inlet door assembly can be pre-assembled for quick installation into an aircraft. Pre-assembly eliminates trimming operations and rigging and misalignment issues. The pivot shafts and bearing housings of the pre-hung air inlet door assembly can be accessed from outside the aircraft when repairs and/or replacement components are needed.

10 Claims, 10 Drawing Sheets

PRE-HUNG INLET DOOR SYSTEM

BACKGROUND OF THE INVENTION

The present invention generally relates to inlet doors and, more particularly, to pre-hung air inlet door systems for gas turbine engines, such as auxiliary power units (APU).

Figure 1:
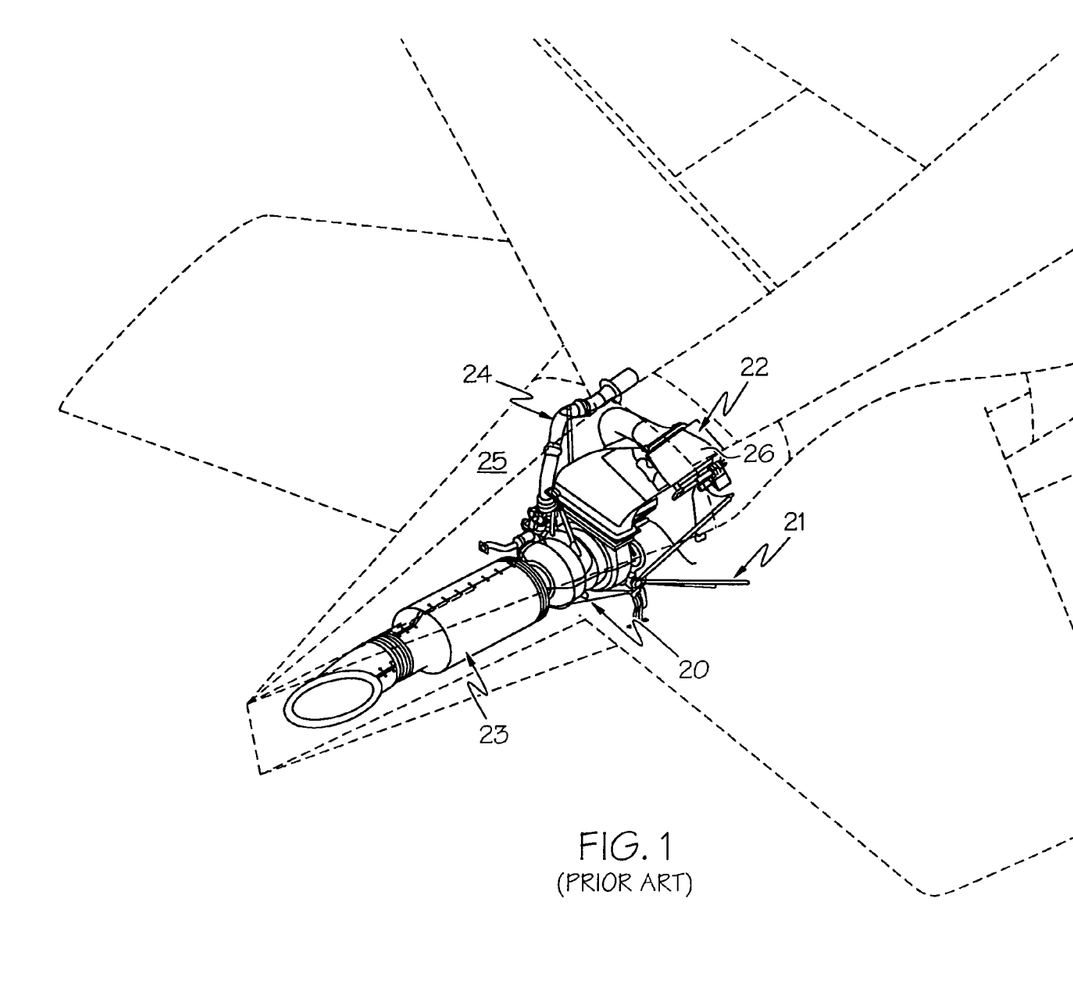
FIG. 1 is an isometric view of a prior art APU installation in the tailcone of an aircraft.

Many modern aircraft are equipped with an airborne APU that provides electrical and pneumatic power to various parts of the aircraft for such tasks as environmental control, lighting, powering electronics, main engine starting, etc. FIG. 1 shows an APU 20 installed in the tailcone of an aircraft 25. In order to utilize the APU 20, various installation systems must be included with the APU 20. Some of the principal systems may include a mount system 21, an inlet system 22, an exhaust system 23, and a pneumatic system 24.

The inlet system 22 for the APU 20 conveys air from outside the aircraft 25 to the APU compressor to be used for combustion and extraction of work. A key component of the inlet system 22 is the air inlet door 26. The air inlet door 26 provides ram recovery for in-flight APU starting and operation, a low loss (pressure) opening for APU operation on the ground, and Foreign Object Damage ("FOD") protection while the APU 20 is not operating and the air inlet door 26 is in the closed position.

U.S. Pat. No. 6,349,899 provides an air inlet mechanism for an aircraft. The mechanism includes, among other components, a housing that forms a fluid conduit. The housing is coupled to an aircraft structure at one end and coupled to a duct structure at the other end. The housing supports a hinge pin that allows an air inlet door to rotate relative to the housing. Motion is imparted on the air inlet door via a rotary actuator coupled to the housing and the hinge pin. The hinge pin extends from the actuator on one wall of the housing, through both side walls of the air inlet door, and through the opposite wall of the housing. Although the described air inlet mechanism can convey air from outside the aircraft to the APU compressor, installation and repair of the air inlet mechanism is time consuming and expensive. Indeed for some small aircraft the engine must be removed to allow access to the components of the air inlet mechanism when repairs are necessary.

The close tolerance interface required between the aircraft skin, the fixed structure of the aircraft, and the motive air inlet door has been difficult to achieve with current designs and current assembly practices. Shimming, hand trimming, and special rigging procedures result in excessive assembly time and often prevent component interchangeability. Binding and misalignment of rotating components are frequently responsible for premature failures of costly air inlet door components such as actuation systems and bearings.

As can be seen, there is a need for an air inlet mechanism wherein assembly time is reduced and component interchangeability is increased. Additionally, an air inlet assembly is needed that can be accessed for repair without removing the engine.

SUMMARY OF THE INVENTION

In one aspect of the present invention, an assembly comprises a door box frame; an actuation system mounted to an outboard surface of the door box frame; and an inlet door disposed within a cavity of the door box frame and operationally connected to the actuation system, the inlet door having a first side and a second side.

In another aspect of the present invention, an assembly for an aircraft comprises a door box frame having a top surface adapted to interface with a skin of the aircraft; a door body having a first side and a second side, the door body positioned within a cavity of the door box frame; a master bearing housing fastened to a master longitudinal member of the door box frame; a master pivot shaft fastened to an interior surface of the first side and in contact with the master bearing housing; a slave bearing housing fastened to a slave longitudinal member of the door box frame; a slave pivot shaft fastened to an interior surface of the second side and in contact with the slave bearing housing; and an actuation system operationally connected to the master pivot shaft.

In still another aspect of the present invention, an assembly comprises a door box frame including a master longitudinal member, a slave longitudinal member, a forward closeout, and an aft closeout; an inlet door positioned between the master longitudinal member and the slave longitudinal member; a master pivot shaft having a flange portion removably attached to a master interface interior surface of the inlet door and having a cylindrical portion positioned through a master interface opening of the inlet door; and an actuation system operationally connected to the master pivot shaft.

In yet another aspect of the present invention, a door box frame for an inlet assembly of an aircraft comprises a master longitudinal member having a bearing housing interface adapted to receive a master bearing housing of the inlet assembly and having an actuator mount interface adapted to receive an actuator mount of the inlet assembly; a slave longitudinal member positioned about parallel to the master longitudinal member; a forward closeout adapted to couple a forward end of the master longitudinal member and a forward end of the slave longitudinal member; and an aft closeout adapted to couple an aft end of the master longitudinal member and an aft end of the slave longitudinal member.

In another aspect of the present invention, an apparatus comprises a door box frame having a master longitudinal member, a slave longitudinal member and a cavity; a master bearing housing in contact with an outboard surface of the master longitudinal member; a slave bearing housing in contact with an outboard surface of the slave longitudinal member; a door body positioned within the cavity, the door body having a first side and a second side; a master pivot shaft having a flange portion removably attached to an interior surface of the first side and having a cylindrical portion in contact with the master bearing housing; a slave pivot shaft having a flange portion removably attached to an interior surface of the second side and having a cylindrical portion in contact with the slave bearing housing; a door cover removably attached to the door body; an actuation system mounted on an outboard surface of the door box frame and operationally connected to the master pivot shaft; and a position feedback device operationally connected to the slave pivot shaft.

In a further aspect of the present invention, a method of conveying an airflow from outside an aircraft to an auxiliary power unit comprises the steps of installing a pre-hung air inlet door assembly in the aircraft; and opening an inlet door of the pre-hung air inlet door assembly.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides pre-hung air inlet doors for gas turbine engines and methods for producing the same. The pre-hung air inlet doors according to the present invention may find beneficial use in many industries including aerospace, automotive, and electricity generation. The present invention may be beneficial in applications including manufacturing and repair of aerospace components. This invention may be useful in any gas turbine engine air inlet door application.

In one embodiment, the present invention provides a pre-hung air inlet door for an APU. The pre-hung air inlet door may comprise a door box frame, an inlet door and an actuation system. Unlike the prior art inlet doors that are assembled during installation, the present invention may be fully assembled prior to installation in an aircraft. Assembling the air inlet door prior to aircraft installation provides numerous advantages over the prior art including the ability to use shop fixtures to assemble the air inlet door. Because precision fixtures can be used for positioning the motive components of the air inlet door, binding can be reduced. The present invention may also allow for a more extensive use of Numerically Controlled ("NC") machined components. By increasing the use of NC machined components, tolerance build up can be reduced and the need for trimming can be eliminated. Because the prior art inlet doors require component trimming during installation, replacement components are not easily interchanged. The elimination of component trimming may provide an increase in component interchangeability, which may lower operating costs to aircraft owners. Additionally, rigging the pre-hung air inlet door in the shop can reduce the number of personnel and time required to achieve operational readiness when installing the air inlet door in the aircraft.

Figure 2:
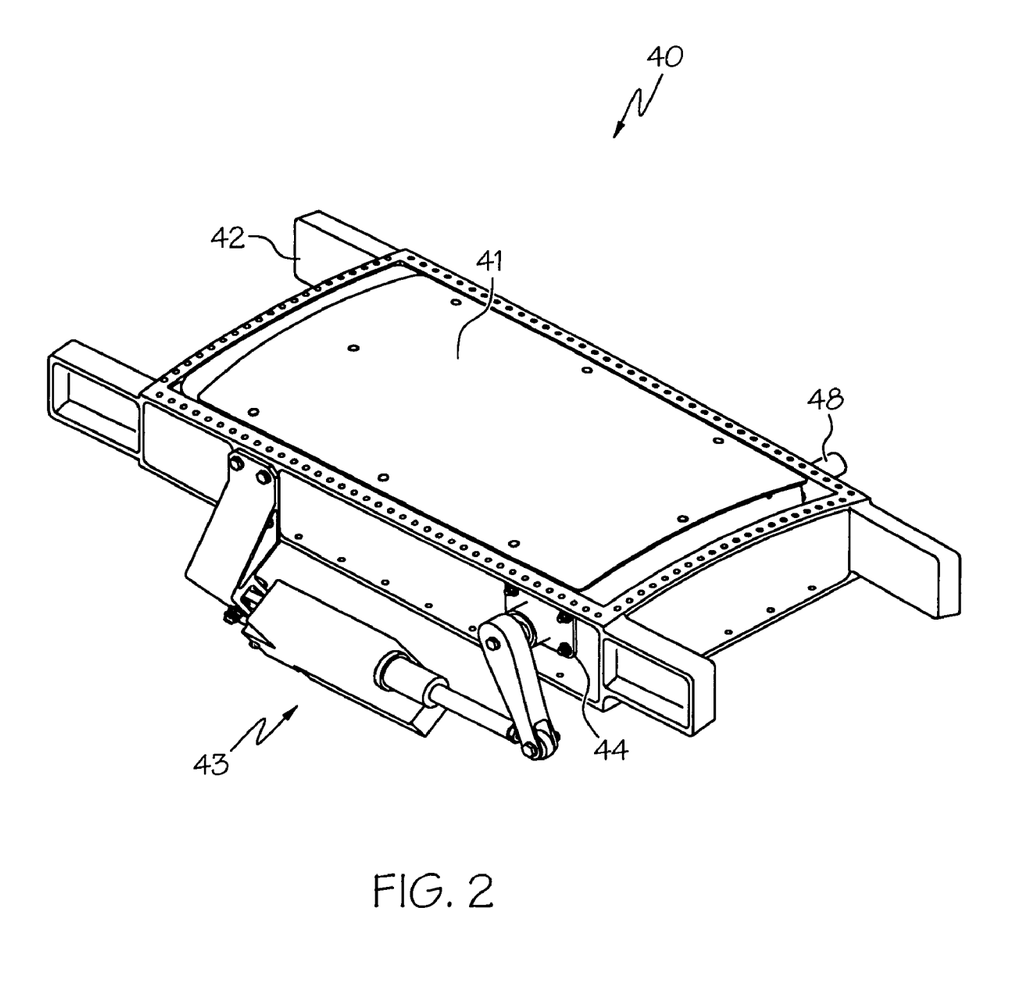
FIG. 2 is an isometric view of a pre-hung air inlet door assembly according to one embodiment of the present invention.
Figure 3:
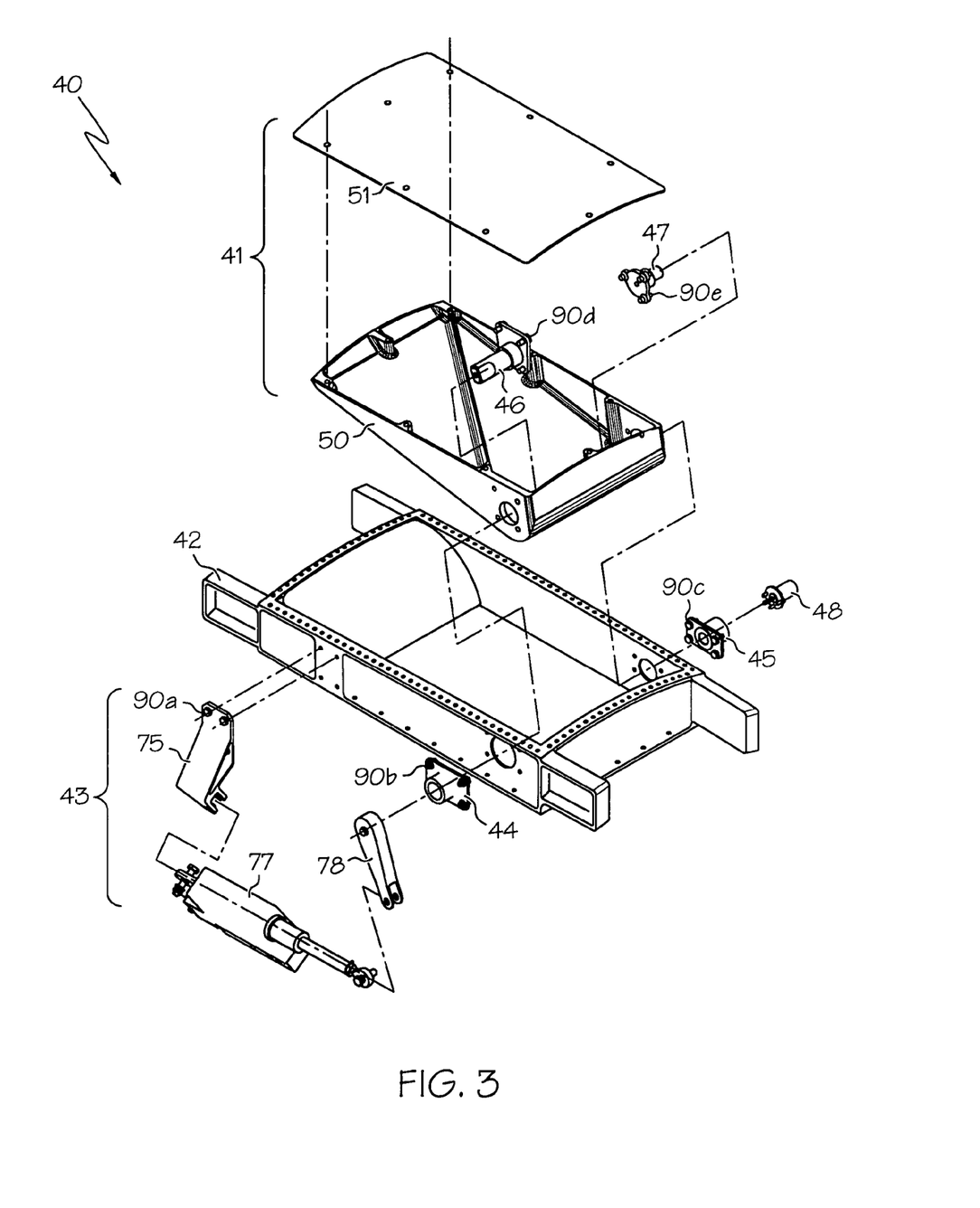
FIG. 3 is an exploded view of the pre-hung air inlet door assembly of FIG. 2.

A pre-hung air inlet door assembly 40 according to an embodiment of the present invention is shown in FIG. 2. The pre-hung air inlet door assembly 40 may comprise an inlet door 41, a door box frame 42 and an actuation system 43. As better seen in FIG. 3, the pre-hung air inlet door assembly 40 may further comprise a master bearing housing 44, a slave bearing housing 45, a master pivot shaft 46, a slave pivot shaft 47 and a position feedback device 48.

Figure 4:
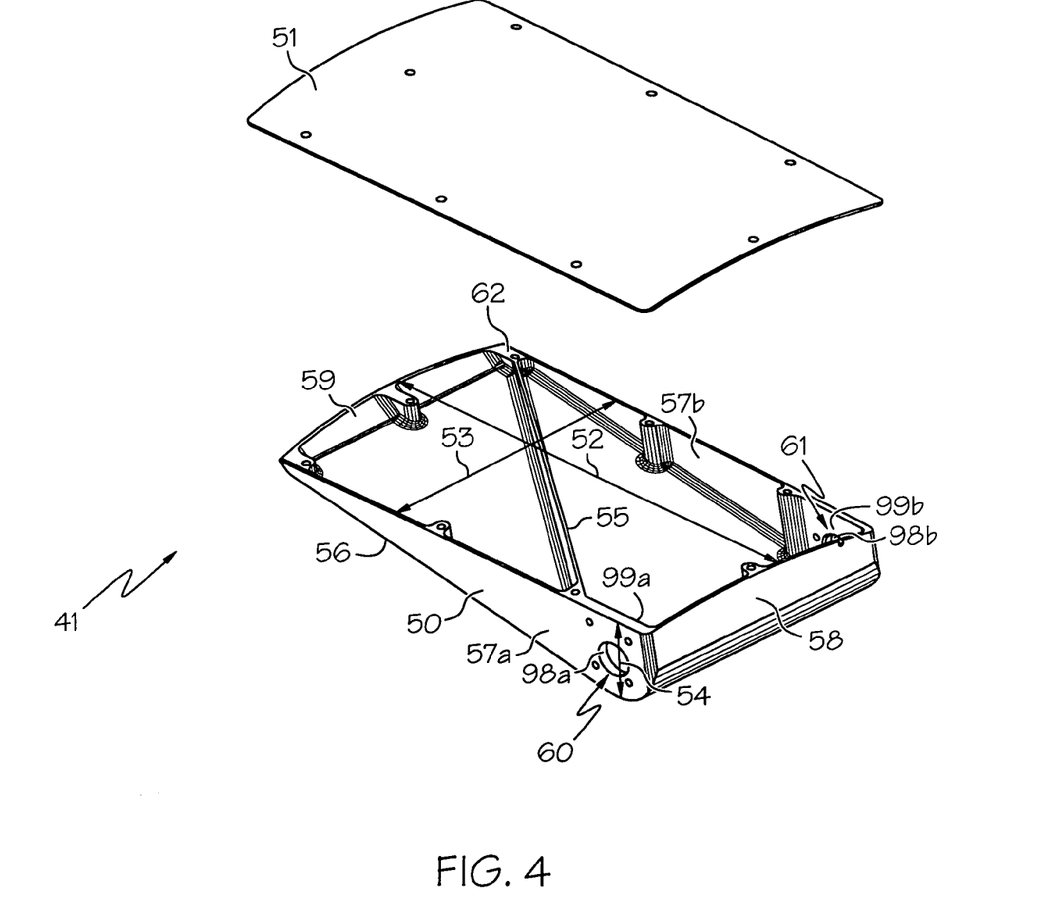
FIG. 4 is an exploded view of an inlet door according to one embodiment of the present invention.

The inlet door 41 may comprise a door body 50 and a door cover 51, as depicted in FIG. 4. The door body 50 may comprise a one piece NC machined component in the shape of a wedge. Alternatively, the door body 50 may comprise a multi-piece precision manufactured wedge shaped component. For some applications, the aspect ratios (length 52: width 53: greatest depth 54) may be approximately 5:3:1. The door body 50 may be sized to provide a sufficient air supply to the APU under all expected operating conditions. Structurally, the door body 50 may be designed to support the aerodynamic pressure loads experienced in flight as well as ice breakout loads in the event that the inlet door 41 becomes covered in ice while the inlet door 41 is closed and it is required to be opened. For additional structural rigidity, the door body 50 may incorporate one or more stiffening webs 55.

An underside 56 (better seen in FIG. 11) of the door body 50, that is the side exposed to oncoming air in flight, may be shaped to provide an efficient low loss surface for air recovery from the boundary layer formed adjacent to the aircraft in flight. A typical shape may be a concave surface with very low eccentricity, widest near a first side 57a, a second side 57b and an aft portion 58 of the door body 50, and narrowest at the forward lip 59. Computational fluid dynamic (CFD) analysis may be useful in determining the desired shape of the underside 56 of the door body 50 for a particular application.

The first side 57a of the door body 50 may include a master interface 60 designed to receive the master pivot shaft 46. The master pivot shaft 46 may be positioned within a master interface opening 98a of the master interface 60. The master pivot shaft 46 may be fastened to a master interface interior surface 99a. The master interface opening 98a may be an opening through the first side 57a. The master interface interior surface 99a may be the surface of the master interface 60 towards the interior of the door body 50. The second side 57b of the door body 50 may include a slave interface 61 designed to receive the slave pivot shaft 47. The slave pivot shaft 47 may be positioned within a slave interface opening 98b of the slave interface 61. The slave pivot shaft 47 may be fastened to a slave interface interior surface 99b. The slave interface opening 98b may be an opening through the second side 57b. The slave interface interior surface 99b may be the surface of the slave interface 61 towards the interior of the door body 50. The sides 57a,b may be designed to receive the pivot shafts (46, 47) and support the door body 50 in the bearings installed in the master bearing housing 44 and the slave bearing housing 45. A backside 62 of the door body 50, which may be open to allow access to the master and slave pivot shafts, 46 and 47, may be shaped to interface with the door cover 51.

The door cover 51 may be designed to attach to the door body 50 via threaded fasteners. For some applications, the door cover 51 may comprise a semi-rigid formed metallic or fabricated composite member. The door cover 51 may be shaped to match the Outer Mold Line ("OML") of the aerodynamic contour (loft) at the location on the aircraft in which the prehung air inlet door assembly 40 is to be installed, e.g., tailcone, sponson, or fuselage.

Figure 5:
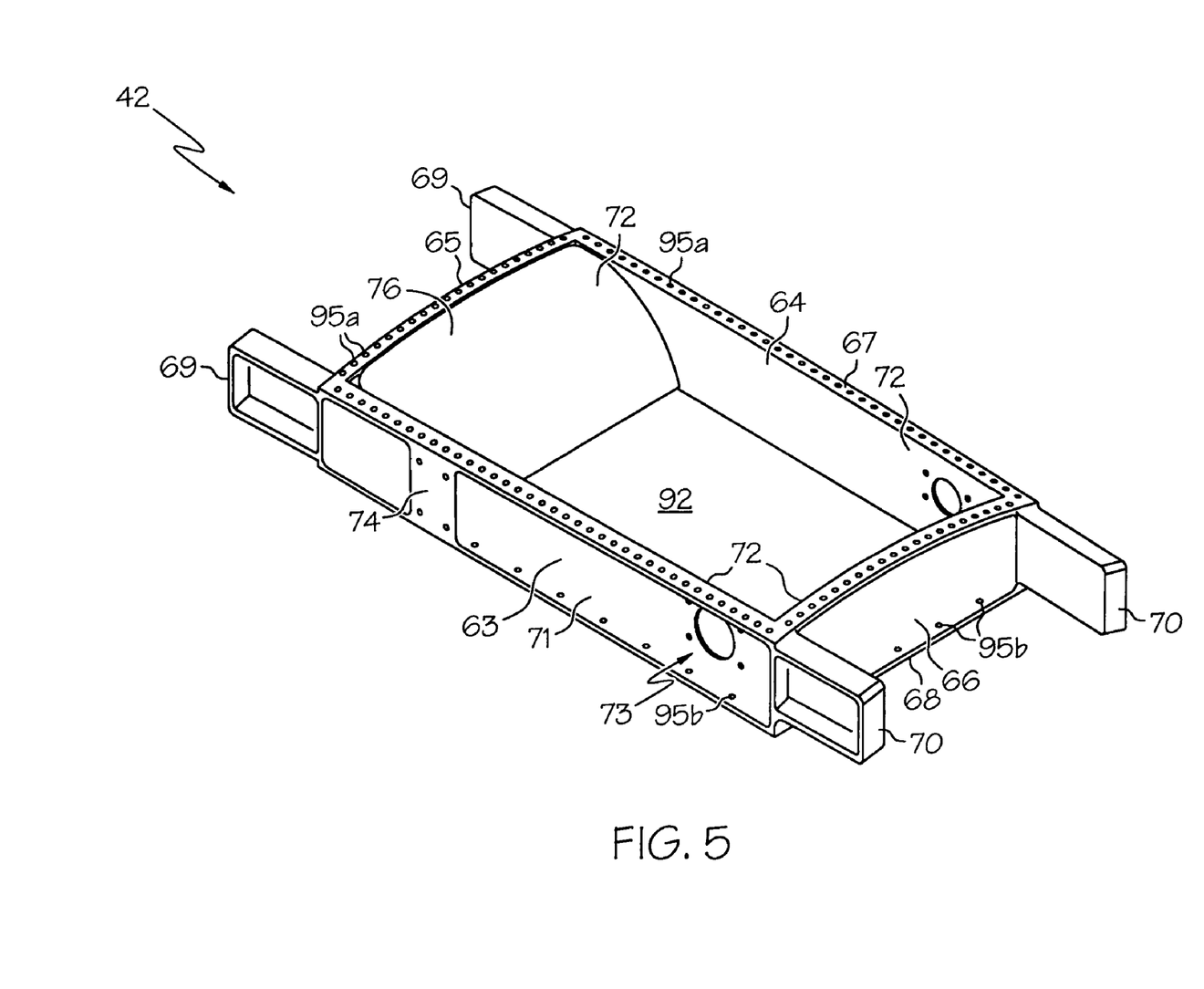
FIG. 5 is an isometric view of a door box frame according to one embodiment of the present invention.

The door box frame 42, an example of which is shown in FIG. 5, may comprise a one piece NC machined component which may provide a functional interface for the remainder of the prehung air inlet door system. The door box frame 42 may have a forward end 69, an aft end 70, an outboard surface 71 and an inboard surface 72. The forward and aft ends, 69 and 70, may be defined with reference to the aircraft in which the pre-hung air inlet door assembly 40 is to be installed. The outboard surface 71 may be the surface facing away from the inlet door 41 and the inboard surface 72 may be the surface facing towards the inlet door 41. The door box frame 42 may comprise a master longitudinal member 63, a slave longitudinal member 64, a forward closeout 65, and an aft closeout 66. The master longitudinal member 63 may be positioned about parallel to the slave longitudinal member 64. The inboard surfaces 72 of the master longitudinal member 63, the slave longitudinal member 64, the forward closeout 65 and the aft closeout 66 may define a cavity 92 for receiving the inlet door 41.

The door box frame 42 may have a top surface 67 and a bottom surface 68. The top surface 67 may be the surface toward the exterior of an aircraft when the door box frame 42 is installed in the aircraft. The bottom surface 68 may be the surface toward the interior of the aircraft when installed. The top surface 67 of the door box frame 42 may have a compound curvature that matches the Inner Mold Line ("IML") of the loft at the location on the aircraft in which the pre-hung air inlet door assembly 40 is to be installed. The top surface 67 may include a plurality of through holes 95a to interface with an aircraft skin (not shown). The top surface 67 may be designed to attach to the aircraft skin via threaded or fixed fasteners. Alternatively, the top surface 67 of the door box frame 42 may be designed to interface with the aircraft skin via clips, latches, or other fastening methods. The bottom surface 68 may include a plurality of through holes 95b to interface with an air inlet duct (not shown). The bottom surface 68 of the door box frame 42 may provide an interface for attachment of the air inlet duct via threaded fasteners. Alternatively, the bottom surface 68 of the door box frame 42 may be designed to interface with the air inlet duct via clips, latches, or other fastening methods. For some applications, the bottom surface 68 of the door box frame 42 may be designed to interface with an air plenum, a diffuser, or other air transport structure of a vehicle.

The master longitudinal member 63 may comprise a channel shaped structure that provides several integral or secondarily attached interface provisions to receive various other components of the pre-hung air inlet door assembly 40 and the aircraft. For some applications, the master longitudinal member 63 may comprise a solid or hollow bar shaped member. The forward end 69 and the aft end 70 of the master longitudinal member 63 may be designed to interface with load bearing members of the aircraft support structure 93 (see FIG. 11), typically a fuselage frame or a cross member. The outboard surface 71 of the master longitudinal member 63 may provide a bearing housing interface 73 to receive the master bearing housing 44 and an actuator mount interface 74 to receive an actuator mount 75 (shown in FIG. 6). The actuator mount interface 74 may receive the actuator mount 75 and transmit the actuation loads into the master longitudinal member 63 and ultimately into the load bearing members of the aircraft. The slave longitudinal member 64 may be substantially similar to the master longitudinal member 63 except that no actuator mount interface 74 is provided.

Figure 9A:
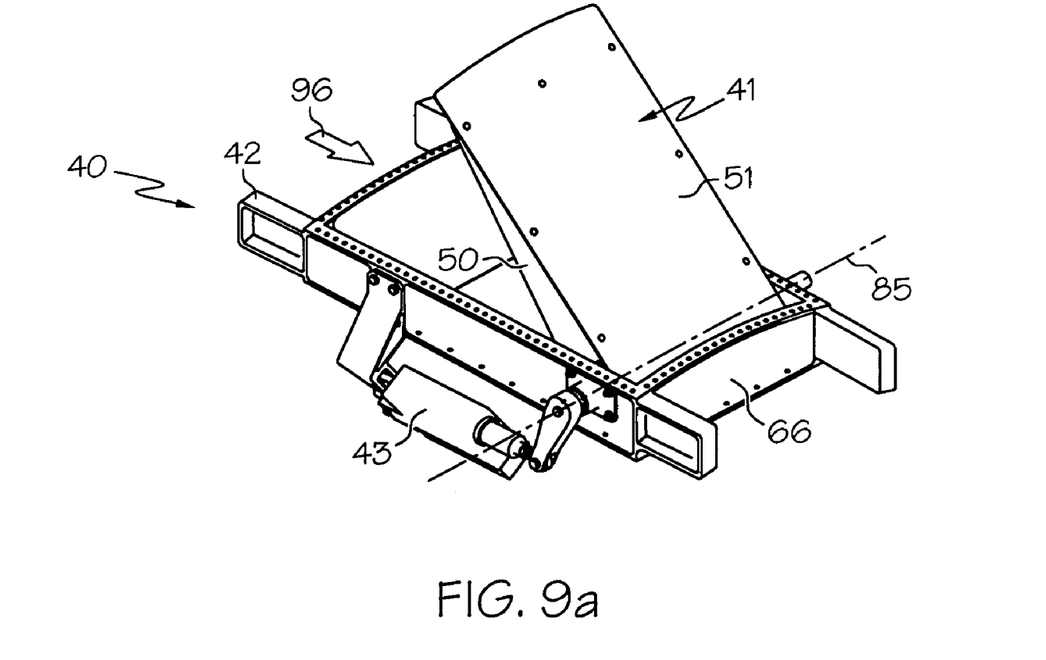
FIG. 9a is an isometric view of a pre-hung air inlet door assembly in an open position according one embodiment of the present invention.
Figure 9B:
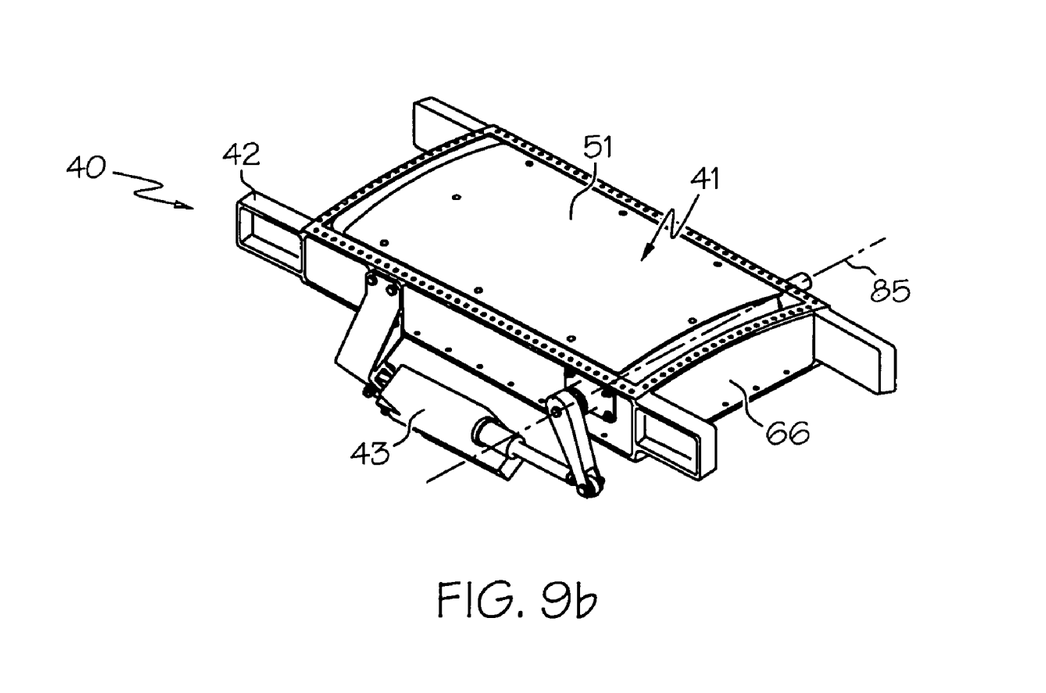
FIG. 9b is the pre-hung air inlet door assembly of FIG. 9a in a closed position.

The forward closeout 65 may couple the master longitudinal member 63 and the slave longitudinal member 64 at the forward end 69 of the door box frame 42. The inboard surface 72 of the forward closeout 65 may provide an aerodynamically efficient flow path (e.g. a bellmouth 76) for the outside air to be drawn in by either suction from the APU or the ram recovery of the inlet door 41 when used in flight. For some applications, the bellmouth 76 may be integral to the forward closeout 65. For some applications, the bellmouth 76 may comprise a curved sheet metal structure attached to the forward closeout 65 by L-shaped brackets (not shown). The aft closeout 66 may couple the master longitudinal member 63 and the slave longitudinal member 64 at the aft end 70 of the door box frame 42. The aft closeout 66 may be designed to provide adequate clearance for the door body 50 and door cover 51 in all operating positions. FIGS. 9a and 9b depict the pre-hung air inlet door assembly 40 in an open and closed position, respectively.

Figure 6:
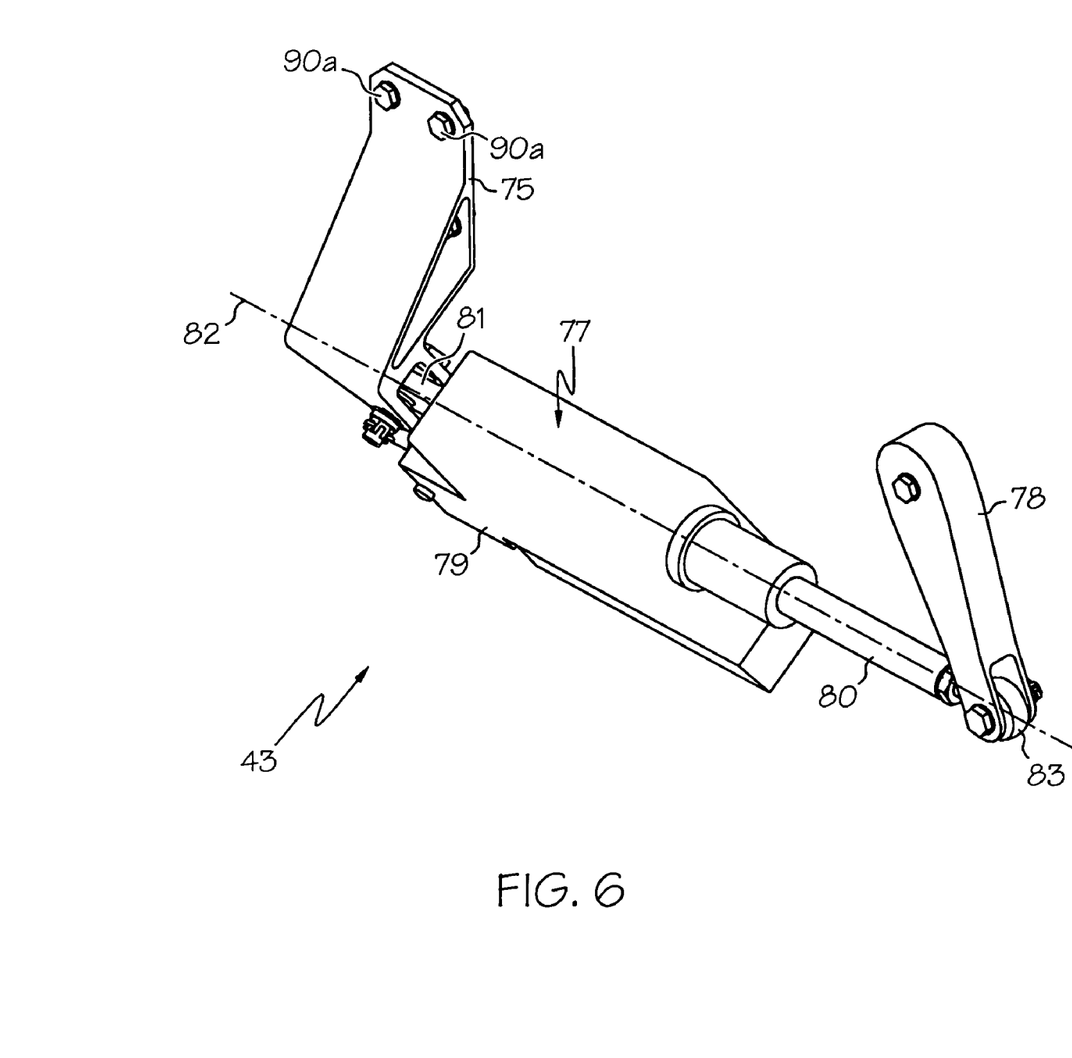
FIG. 6 is an isometric view of an actuation system according to one embodiment of the present invention.

The actuation system 43, an example of which is shown in FIG. 6, may be designed to provide the motive force to open and close the inlet door 41. The actuation system 43 may comprise the actuator mount 75 mentioned above, an actuator 77 and an actuator arm 78 (coupling link).

The actuator mount 75, which may be attached to the master longitudinal member 63 via threaded fasteners 90a, may provide a yoke-style interface to accept a lug 81 from the actuator 77. The actuator mount 75 may protrude from the master longitudinal member 63 so that the actuator 77 can hang freely from the actuator mount 75 so as not to clash with other components of the pre-hung air inlet door assembly 40. The actuator mount 75 may include bushed holes (not shown) to reduce vibration and facilitate in-service repairability.

The actuator 77 may comprise an electromechanical actuator. The actuator 77 may include a stationary portion 79, or housing, and a motive portion, such as a ball screw 80. The stationary portion 79 may include an electric motor (not shown) and a gear train (not shown). The stationary portion 79 may include the lug 81 containing a spherical bearing (not shown) located along a line of motion 82 of the ball screw 80. One end of the ball screw 80 may incorporate a rod end 83 designed to couple with the actuator arm 78. The spherical bearing and the rod end 83 both may aid in compensating for any minor misalignments between the relative motion components of the pre-hung air inlet door assembly 40. For some applications, a fluidic actuator may be used in place of the electromechanical actuator.

The actuator arm 78 may couple the rod end 83 and the master pivot shaft 46. The actuator arm 78 may convert the linear force imparted by the actuator 77 into a torque through the master pivot shaft 46 which may impart motion on the inlet door 41. The interface at the rod end 83 may be a fork incorporating one flanged bushing (not shown) and one slip bushing (not shown) for vibration reduction and in-service repairability. The interface at the master pivot shaft 46 may be of any suitable form to transmit torque such as a rectangular slot (not shown) on the actuator arm 78 and at least one circumferential flat area 97 (see FIG. 8) on the end of the master pivot shaft 46.

Figure 7:
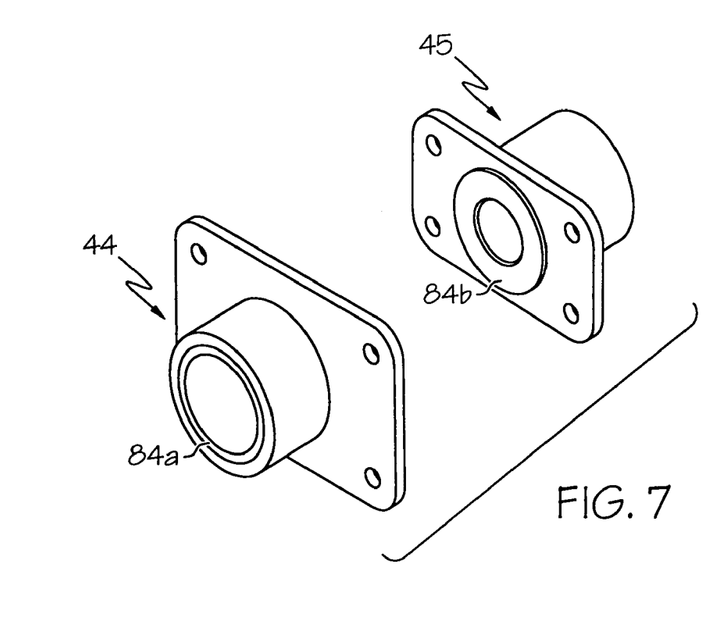
FIG. 7 is an isometric view of a master bearing housing and a slave bearing housing according one embodiment of the present invention.

The master bearing housing 44 and the slave bearing housing 45, depicted in FIG. 7, each may be a machined component that includes a press fit self lubricating bearing, 84a and 84b. Alternatively, the bearing housings 44 and 45 may include mechanically retained bearings (e.g. bearings retained by set screws or keys) in place of the press fit bearings. The bearings 84a, 84b may provide a low friction support for the master and slave pivot shafts 46, 47, which rotate relative to the longitudinal members 63, 64 of the door box frame 42. The bearing housings 44, 45 may be designed to be removably attached to the longitudinal members 63, 64 of the door box frame 42 to allow bearing replacement without the need to remove the door box frame 42 from the aircraft. The bearing housings 44, 45 may be attached to the door box frame 42 via threaded fasteners 90b, 90c (see FIG. 3). The bearing housings 44, 45 may be attached to the outboard surface 71 the door box frame 42.

Figure 8:
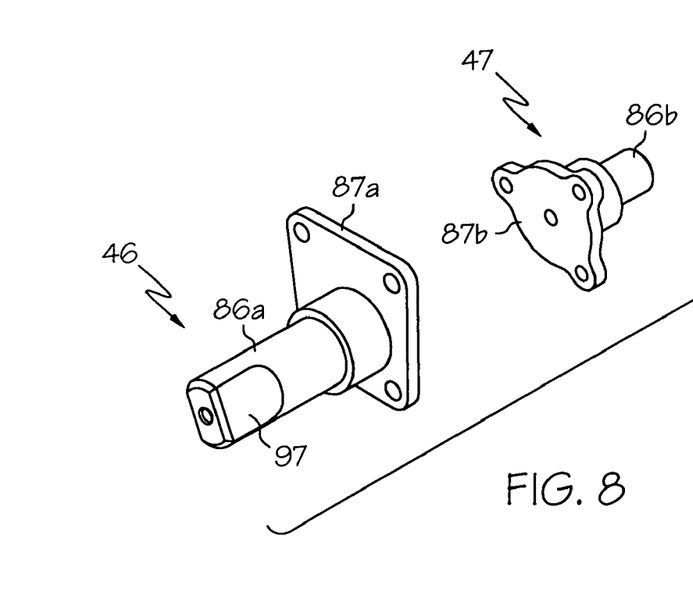
FIG. 8 is an isometric view of a master pivot shaft and a slave pivot shaft according to one embodiment of the present invention.

The master pivot shaft 46 and the slave pivot shaft 47 are depicted in FIG. 8. The pivot shafts 46, 47 each may comprise one piece machined components. Alternatively, the master and slave pivot shafts 46, 47 each may comprise multiple piece components. The pivot shafts 46, 47 may support the door body 50 within the door box frame 42 and provide an axis of rotation 85 (see FIGS. 9a and 9b) about which the inlet door 41 operates. Each pivot shaft 46, 47 may comprise a cylindrical portion 86a, 86b and a flange portion 87a, 87b. The cylindrical portions 86a, 86b may be designed to interface with the respective bearing in the bearing housings 44, 45 mounted on the longitudinal members 63, 64 of the door box frame 42. The flange portions 87a, 87b may be designed to interface with the sides 57a, 57b of the door body 50. The pivot shafts 46, 47 may be attached to the door body 50 via threaded fasteners 90d, 90e (see FIG. 3). The master pivot shaft 46 may comprise an interface for the actuator arm 78, such as the circumferential flat areas 97.

The cylindrical portion 86a of the master pivot shaft 46 may be positioned within the master interface opening 98a. The flange portion 87a of the master pivot shaft 46 may be fastened to the master interface interior surface 99a. The cylindrical portion 86b of the slave pivot shaft 47 may be positioned within the slave interface opening 98b. The flange portion 87b of the slave pivot shaft 47 may be fastened to the slave interface interior surface 99b. The slave interface opening 98b may be an opening through the second side 57b. The slave interface interior surface 99b may be the surface of the slave interface 61 towards the interior of the door body 50.

Figure 10:
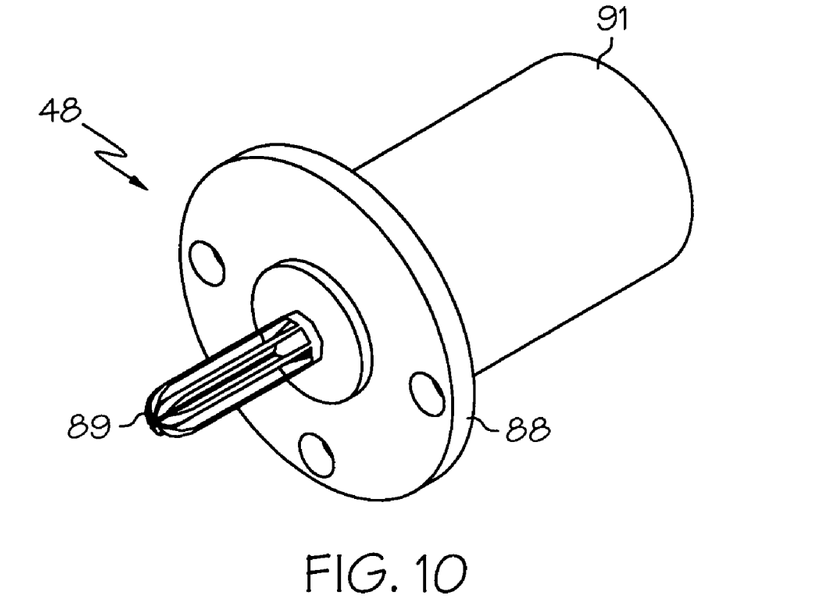
FIG. 10 is an isometric view of a position feedback device according one embodiment of the present invention.

The position feedback device 48 in the form of a Rotary Variable Differential Transducer ("RVDT") is shown in FIG. 10. The position feedback device 48 may provide closed loop feedback to a door control logic (not shown) on the position of the inlet door 41. The position feedback can be either as a continuous position, such as percent open or door angle, as can be achieved by the RVDT, or a discreet position, such as open or closed, achievable by limit switches (not shown). For some applications, a Linear Variable Differential Transducer ("LVDT") and kinematic linkage may be utilized in place of the RVDT for door position indication. For robustness, the position feedback device 48 may be coupled to the slave side of the pre-hung air inlet door assembly 40. The position feedback device 48 may comprise a mounting flange 88, a spline 89 and a device housing 91. The mounting flange 88 may be designed to interface with the slave bearing housing 45. The spline 89 may be designed to interface with the slave pivot shaft 47 to transmit inlet door movement to the positive feedback device 48. The device housing 91 may be designed to remain stationary relative to the slave pivot shaft 47.

Figure 11:
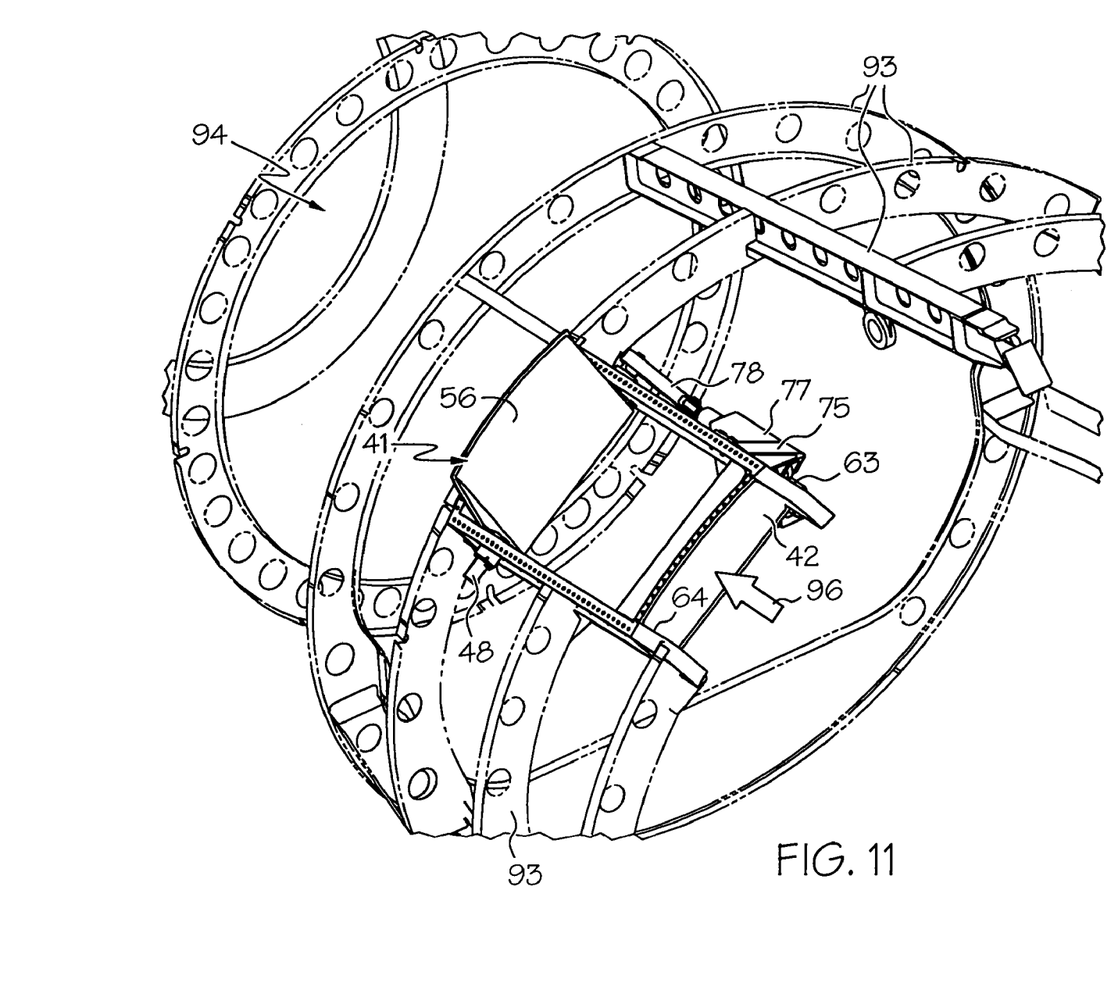
FIG. 11 is an isometric view of a pre-hung air inlet door assembly installed in a representative section of an aircraft according one embodiment of the present invention.

One embodiment of the pre-hung air inlet door assembly 40 may be assembled and installed in an aircraft in the following manner. Beginning with the door box frame 42, the master bearing housing 44 may be installed on the outboard surface 71 of the master longitudinal member 63. The slave bearing housing 45 may be installed on the outboard surface 71 of the slave longitudinal member 64. The door body 50 may be positioned within the cavity 92 of the door box frame 42. The master and slave pivot shafts, 46 and 47, may be installed from the inside of the door body 50. The pivot shafts 46, 47 may penetrate the sides 57a, 57b of the door body 50 and may be inserted into the bearing housings 44, 45 on the longitudinal members 63, 64 of the door box frame 42. The actuator arm 78 may be attached to the master pivot shaft 46. The actuator mount 75 may be attached to the master longitudinal member 63 of the door box frame 42. The actuator 77 may be installed between the actuator mount 75 and the actuator arm 78. The position feedback device 48 may then be installed. All final adjustments may then be made to ensure full range of motion without binding. The door cover 51 may be attached to the door body 50. The pre-hung air inlet door assembly 40 may be positioned within the aircraft at the location in which it is to be installed. The longitudinal members 63, 64 of the door box frame 42 may be fastened to the aircraft support structure 93, as depicted in FIG. 11 and the top surface 67 of the door box frame 42 may be fastened to the aircraft skin (not shown). FIG. 11 shows the pre-hung air inlet door assembly 40 installed in a representative section of an aircraft 94. The pre-hung air inlet door 40 is shown in the open position with an airflow 96 entering. For clarity, some of the aircraft components and the aircraft skin have been omitted.

Other variations to the described pre-hung air inlet door assembly 40 may include incorporating the bearing housings 44, 45 into the longitudinal members 63, 64 of the door box frame 42. Other variations may include incorporating the actuator mount 75 into the master longitudinal member 63 of the door box frame 42. Another useful variation may comprise using a torque motor (not shown) connected to the master pivot shaft 46 either directly or through a gear train (not shown) in place of the actuator 77, the actuator arm 78 and the actuator mount 75. The master longitudinal member 63 of the door box frame 42 may be designed to provide a suitable mounting pad for the torque motor.

Figure 12:
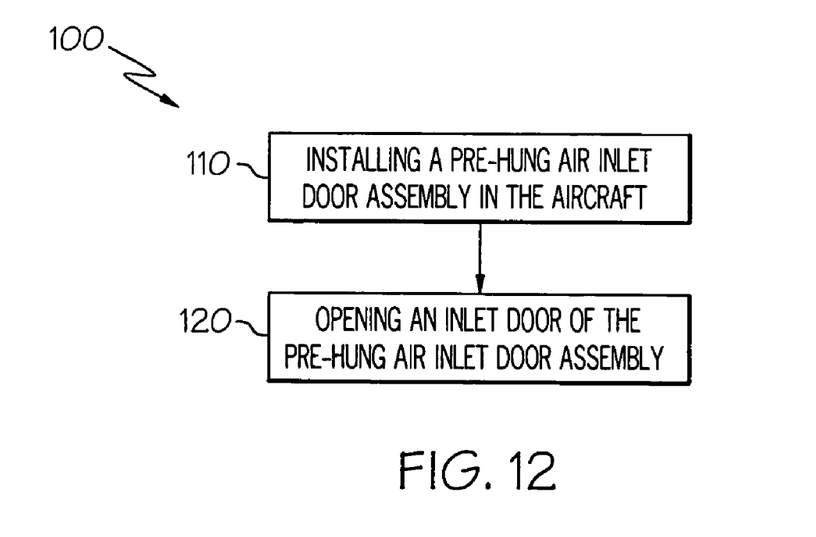
FIG. 12 is a flow chart of a method for conveying an airflow from outside an aircraft to an auxiliary power unit according one embodiment of the present invention.

A method 100 of conveying an airflow from outside an aircraft to an auxiliary power unit is depicted in FIG. 12. The method 100 may comprise a step 110 of installing a pre-hung air inlet door assembly in the aircraft and a step 120 of opening an inlet door of the pre-hung air inlet door assembly. The step 110 of installing may comprise fastening a door box frame of the pre-hung air inlet door assembly to a support structure of the aircraft. The step 120 of opening may comprise operating an actuation system of the pre-hung air inlet door assembly such that motion is imparted on the inlet door by a master pivot shaft of the assembly. The step 120 may comprise operating an actuation system comprising an electromechanical actuator. The step 120 may comprise operating an actuation system comprising a fluidic actuator.

As can be appreciated by those skilled in the art, the present invention provides pre-hung air inlet door assemblies. The components of the present invention can be manufactured and pre-assembled with shop fixturing. The use of high-speed machining for the door body and frames can eliminate trimming operations. The positioning of the actuation system mounting with assembly and drill fixtures can eliminate all rigging and misalignment issues. The entire pre-assembled door assembly can be supplied as a unit, which is "floated" into the aircraft structure. Since all actuation components and all components experiencing relative motion can be assembled in close tolerance fixturing, the assembled unit can be located with generous installation tolerances that may have no impact to the system performance. Further, the removal of the door cover provides easy access to the pivot shafts and bearing housings when repair or replacement is needed.

It should be understood, of course, that the foregoing relates to exemplary embodiments of the invention and that modifications may be made without departing from the spirit and scope of the invention as set forth in the following claims.

We claim:

1. An assembly for an aircraft having a skin and a support structure including load bearing members, the assembly comprising:
   a door box frame formed by a master longitudinal member, a slave longitudinal member, a forward closeout, and an aft closeout, each of said master longitudinal member, said slave longitudinal member, said forward closeout, and said aft closeout including a top surface and said aircraft skin fastening interface on said top surface to attach said door box frame to said skin of said aircraft, each of said master longitudinal member and said slave longitudinal member having a forward end and an aft end configured to interface with the load bearing members of the support structure of the aircraft;
   an inlet door coupled to said door box frame, said inlet door including a door body and a door cover, said door body having a first side, a second side, a forward lip, and an aft portion, said first side configured to extend along said master longitudinal member and said second side configured to extend along said slave longitudinal member such that said door body is positioned within said cavity of said door box frame, and said door cover extending over and attached to said door body;
   a master bearing housing fastened to said master longitudinal member of said door box frame;
   a master pivot shaft fastened to an interior surface of said first side and in contact with said master bearing housing;
   a slave bearing housing fastened to said slave longitudinal member of said door box frame;
   a slave pivot shaft fastened to an interior surface of said second side and in contact with said slave bearing housing; and
   an actuation system operationally connected to said master pivot shaft.

2. The assembly of claim 1, wherein said top surface includes a plurality of through holes.

3. The assembly of claim 1, further comprising a position feedback device operationally connected to said door body.

4. The assembly of claim 3, wherein said position feedback device comprises a Rotary Variable Differential Transducer.

5. The assembly of claim 3, wherein said position feedback device comprises a Linear Variable Differential Transducer.

6. The assembly of claim 1, wherein said actuation system comprises an actuator mount connected to said door box frame, an actuator arm coupled to said master pivot shaft and an actuator positioned between and coupled to said actuator mount and said actuator arm.

7. The assembly of claim 6, wherein said actuator mount is integral to said door box frame.

8. The assembly of claim 1, wherein said door box frame includes a bottom surface adapted to interface with an air inlet duct of said aircraft.

9. The assembly of claim 1, wherein said door box frame includes a bottom surface adapted to interface with an air plenum of said aircraft.

10. The assembly of claim 1, wherein said door box frame includes a bottom surface adapted to interface with a diffuser of said aircraft.

* * * * *

UNITED STATES PATENT AND TRADEMARK OFFICE
CERTIFICATE OF CORRECTION

| | |
|---|---|
| PATENT NO. | : 7,600,713 B2 |
| APPLICATION NO. | : 11/072467 |
| DATED | : October 13, 2009 |
| INVENTOR(S) | : Hein et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1016 days.

Signed and Sealed this

Fifth Day of October, 2010

David J. Kappos
*Director of the United States Patent and Trademark Office*